US012580984B2

(12) United States Patent
Nooren

(10) Patent No.: US 12,580,984 B2
(45) Date of Patent: Mar. 17, 2026

(54) ENABLING MULTI-EDGE APPLICATIONS

(71) Applicants: Koninklijke KPN N.V., Rotterdam (NL); Nederlandse Organisatie Voor Toegepast-Natuurwetenschappelijk Onderzoek TNO, The Hague (NL)

(72) Inventor: Pieter Nooren, Delft (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 392 days.

(21) Appl. No.: 18/267,045

(22) PCT Filed: Dec. 13, 2021

(86) PCT No.: PCT/EP2021/085444
§ 371 (c)(1),
(2) Date: Jun. 13, 2023

(87) PCT Pub. No.: WO2022/128889
PCT Pub. Date: Jun. 23, 2022

(65) Prior Publication Data
US 2024/0056497 A1 Feb. 15, 2024

(30) Foreign Application Priority Data
Dec. 14, 2020 (EP) .................................... 20213818

(51) Int. Cl.
*H04L 67/1087* (2022.01)
*H04L 67/30* (2022.01)
(Continued)

(52) U.S. Cl.
CPC .......... *H04L 67/1091* (2013.01); *H04L 67/30* (2013.01); *H04L 67/52* (2022.05); *H04W 4/60* (2018.02)

(58) Field of Classification Search
CPC ...... H04W 4/60; H04L 67/1091; H04L 67/52; H04L 67/30
See application file for complete search history.

(56) References Cited

U.S. PATENT DOCUMENTS

2015/0312366 A1* 10/2015 Ben-Yehuda ....... H04L 67/1097
709/213
2018/0039710 A1* 2/2018 Chen .................... G06F 16/9024
(Continued)

FOREIGN PATENT DOCUMENTS

CN 109274745 A 1/2019

OTHER PUBLICATIONS

International Search Report and Written Opinion for PCT/EP2021/085444, mailed: Apr. 5, 2022.
(Continued)

*Primary Examiner* — Jonathan A Bui
(74) *Attorney, Agent, or Firm* — Hamilton, Brook, Smith & Reynolds, P.C.

(57) ABSTRACT

A mapping system and method may be provided for facilitating setup of an application data flow between an edge application server which may be instantiated on one or more edge nodes of a mobile network and a remote server outside of the mobile network. The system and method may obtain a client identifier identifying a client device configured to utilize an edge application service of the edge application server, obtain an external endpoint identifier of an external endpoint of the edge application server, wherein the external endpoint allows the edge application server to be reached by data communication from outside of the mobile network, generate mapping data associating the client identifier with the external endpoint identifier, using the mapping data, provide a communication interface to enable a network entity which is configured to setup the application data flow between the edge application server and the remote server to (Continued)

obtain the external endpoint identifier on the basis of the client identifier. Such a mapping system may enable application data flows to be setup between edge application servers in different mobile networks on the basis of the mapping data.

11 Claims, 10 Drawing Sheets

(51) Int. Cl.
H04L 67/52 (2022.01)
H04W 4/60 (2018.01)

(56) References Cited

U.S. PATENT DOCUMENTS

| | | | | |
|---|---|---|---|---|
| 2019/0158370 | A1 * | 5/2019 | You | H04L 41/16 |
| 2020/0099549 | A1 * | 3/2020 | Gummadidala | H04L 12/2856 |
| 2020/0205040 | A1 | 6/2020 | Jin et al. | |
| 2020/0210342 | A1 * | 7/2020 | Zeng | G06F 12/0882 |
| 2020/0267518 | A1 | 8/2020 | Sabella et al. | |
| 2021/0219220 | A1 * | 7/2021 | Hall | H04W 36/0085 |
| 2024/0334364 | A1 * | 10/2024 | Nooren | H04L 67/34 |

OTHER PUBLICATIONS

European Search Report for European patent application: 20213818. 6, Jun. 7, 2021.
ETSI White Paper No. 28—MEG in 5G networks; First edition—Jun. 2018.
ETSI GS MEC 003 V2.1.1, Multi-access Edge Computing (MEC); Framework and Reference Architecture, (Jan. 2019).
ETSI GS MEC 030 V2.1.1, Multi-access Edge Computing (MEC); V2X Information Service API, (Apr. 2020).
Operator Platform Concept—Phase 1: Edge Cloud Computing, Jan. 2020.
3GPP TS V1.1.0 Technical Specification, 3rd Generation Partnership Project, Technical Specification Group Services and System Aspects; Architecture for Edge Applications; Release 17; (Oct. 2020).

* cited by examiner

ENABLING MULTI-EDGE APPLICATIONS

This application is the U.S. National Stage of International Application No. PCT/EP2021/085444, filed Dec. 13, 2021, which designates the U.S., published in English, and claims priority under 35 U.S.C. § 119 or 365(c) to European Application No. 20213818.6, filed Dec. 14, 2020. The entire teachings of the above applications are incorporated herein by reference.

TECHNICAL FIELD

The invention relates to a mapping system and method for facilitating setup of an application data flow between an edge application server which is instantiated on one or more edge nodes of a mobile network and a remote server outside of the mobile network. The invention further relates to a client device and a corresponding method, to the one or more edge nodes and a corresponding method, and to an application service provider system and a corresponding method. The invention further relates to a computer-readable medium comprising a computer program for performing any of the above methods, and to mapping data generated by the mapping system and method.

BACKGROUND

Multi-access Edge Computing (MEC) [1], or in short edge computing, is a computing paradigm where compute nodes may be located relatively close to a client device, for example at an edge of a mobile network. Such compute nodes may therefore also be referred to as edge nodes or simply as edges, and their location may enable high-bandwidth and low-latency connectivity between client devices and edge nodes. Edge computing may be seen as an enabler for applications with high computing and bandwidth resource remands, including real-time data processing and high-definition Extended (e.g., Augmented or Virtual) Reality streaming applications.

In particular, edge computing techniques may be employed by application service providers (ASPs, also referred to as application providers, AP) to deliver application functionality and associated services across a network. In such ASP/AP-arranged edge computing, a client device may execute a client application of the application provider, while an edge application server may be instantiated on one or a distributed system of edge nodes to provide an edge application service which can be utilized by the client application. Such an edge application service may for example process application data generated by the client application, such as captured sensor data, or process data received from other entities to be used by the client application.

A typical edge computing use case may be one where a client device may send a continuous high-bandwidth data stream to an edge node, with the edge node processing the data stream to obtain an output, e.g., an analysis result, and then transmitting the output to a cloud server or other receiving entity. For example, a lightly or uncompressed high-definition video stream may be uploaded to an edge node; the edge node may then analyze the video stream to extract metadata tags from the video stream and forward the metadata tags to the cloud server or other receiving entity, potentially along with a stronger compressed version of the video stream to impose lighter networking requirements on the backhaul network upstream of the edge node.

The edge node(s) instantiating an edge application server are typically part of a mobile network which may be managed by a mobile network operator. However, it may be desirable for network entities outside of the mobile network to be able communicate with the edge application server. For example, it may be desirable to setup an application data flow between the edge application server and a remote server outside of the mobile network. An example of such a remote server is another edge application server in another mobile network ('edge-to-edge') or a cloud server ('edge-to-cloud' or 'cloud-to-edge'). Accordingly, application data may be transmitted from the edge application server to the remote service and vice versa.

Such outside communication may also be desirable to enable such application data flows to be setup by a network entity located outside of the mobile network. An example of the latter is a system of an application (service) provider.

The above desire is also recognized at the requirements level by ETSI specification [2] which states that inter-MEC system communication should address the following high-level requirements. Here, the term 'inter-MEC systems' refers to the example of the outside network entities being edge nodes of another MEC system.

"1) A MEC platform should be able to discover other MEC platforms that may belong to different MEC systems;

2) A MEC platform should be able to exchange information in a secure manner with other MEC platforms that may belong to different MEC systems.

3) A MEC application should be able to exchange information in a secure manner with other MEC applications that may belong to different MEC systems."

ETSI specification [3] explains how inter-MEC application communication can be achieved. Namely, as described in section 5.4.3 of [3], this may involve the "exposing the available communication end point information for peer to peer connectivity" using an application programming interface (API).

Disadvantageously, the exposure of the communication endpoints which are internal to the MEC systems via an API may be considered to violate key requirements put forward by GSMA's work on the Operator Platform (OP) [4]. These requirements seek to bring about a 'separation of concerns' between the OP and application provider, and may essentially require that the OP and the application provider not know about each other's internal workings, including the internal topology, physical locations of edge instances, configuration and IP addressing.

It may be desirable for an application provider to be able to distribute demanding applications, such as eXtended Reality Communication (XRC) applications, over edge nodes of different mobile networks. Given the abovementioned requirements, it may not be possible for an application provider to set up the required edge-edge connections for the application data flows, as the endpoints of the edge application servers to be used for setting up the connectivity between edges may be unknown to the application provider. Similar problems exist when desiring to setup so-called edge-to-cloud or cloud-to-edge application data flows between an edge application server and a cloud server.

REFERENCES

[1] ETSI White Paper No. 28—MEC in 5G networks; First edition—June 2018, ISBN No. 979-10-92620-22-1.

3 4

[2] ETSI GS MEC 003 V2.1.1 (2019 January), Multi-access Edge Computing (MEC); Framework and Reference Architecture

[3] ETSI GS MEC 030 V2.1.1 (2020 April), Multi-access Edge Computing (MEC); V2X Information Service API

[4] Operator Platform Concept—Phase 1: Edge Cloud Computing, January 2020, GSMA.

SUMMARY

It may be desirable to facilitate setting up an application data flow between an edge application server which is instantiated on one or more edge nodes of a mobile network and a remote server outside of the mobile network.

In accordance with a first aspect of the invention, a mapping system may be provided for facilitating setup of an application data flow between an edge application server which may be instantiated on one or more edge nodes of a mobile network and a remote server outside of the mobile network. The mapping system may comprise:

a network interface to the mobile network;

a processor subsystem which may be configured to, using the network interface:

obtain a client identifier identifying a client device configured to utilize an edge application service of the edge application server;

obtain an external endpoint identifier of an external endpoint of the edge application server, wherein the external endpoint may allow the edge application server to be reached by data communication from outside of the mobile network;

generating mapping data associating the client identifier with the external endpoint identifier; and using the mapping data, provide a communication interface to enable a network entity which may be configured to setup the application data flow between the edge application server and the remote server to obtain the external endpoint identifier on the basis of the client identifier.

In accordance with a further aspect of the invention, a computer-implemented method may be provided for facilitating setup of an application data flow between an edge application server which may be instantiated on one or more edge nodes of a mobile network and a remote server outside of the mobile network. The method may comprise:

obtaining a client identifier identifying a client device configured to utilize an edge application service of the edge application server;

obtaining an external endpoint identifier of an external endpoint of the edge application server, wherein the external endpoint may allow the edge application server to be reached by data communication from outside of the mobile network;

generating mapping data associating the client identifier with the external endpoint identifier; and using the mapping data, provide a communication interface to enable a network entity which may be configured to setup the application data flow between the edge application server and the remote server to obtain the external endpoint identifier on the basis of the client identifier.

In accordance with a further aspect of the invention, a client device may be provided which client device may be configured for utilizing an edge application service of an edge application server, wherein the edge application server may be instantiated on one or more edge nodes of a mobile network. The client device may comprise:

a network interface to the mobile network;

a processor subsystem which may be configured to, using the network interface, obtain a server identifier of the edge application server;

provide the server identifier together with a client identifier of the client device to a mapping system, which mapping system may be configured to, based on the server identifier, generate mapping data associating the client identifier with an external endpoint identifier of an external endpoint of the edge application server.

In accordance with a further aspect of the invention, a computer-implemented method may be provided for utilizing an edge application service of an edge application server, wherein the edge application server may be instantiated on one or more edge nodes of a mobile network. The method may comprise:

obtaining a server identifier of the edge application server;

providing the server identifier together with a client identifier of the client device to a mapping system, which mapping system may be configured to, based on the server identifier, generate mapping data associating the client identifier with an external endpoint identifier of an external endpoint of the edge application server.

In accordance with a further aspect of the invention, an edge node or a system of edge nodes of a mobile network may be provided. The edge node or the system of edge nodes may comprise:

a network interface to the mobile network; and a processor subsystem which may be configured to instantiate an edge application server, wherein the edge application server may be configured to provide an edge application service to a client device;

wherein the edge application server may be configured with an internal endpoint via which internal endpoint the edge application server may be reachable by the client device by data communication from inside of the mobile network and with an external endpoint via which external endpoint the edge application server may be reachable by data communication from outside of the mobile network.

In accordance with a further aspect of the invention, a computer implemented method may be provided which may comprise:

instantiating an edge application server, wherein the edge application server may be configured to provide an edge application service to a client device;

configuring the edge application server with an internal endpoint via which internal endpoint the edge application server may be reachable by data communication from inside of the mobile network and with an external endpoint via which external endpoint the edge application server may be reachable by data communication from outside of the mobile network.

In accordance with a further aspect of the invention, an application service provider system may be provided for setting up an application data flow between an edge application server which may be instantiated on one or more edge nodes of a mobile network and a remote server outside of the mobile network. The application service provider system may comprise:

a network interface;

a processor subsystem which may be configured to, using the network interface:

obtain an external endpoint identifier of an external endpoint of the edge application server from a mapping system on the basis of a client identifier of a client device which client device may be configured to utilize an edge application service of the edge application server, wherein the external endpoint may allow the edge application server to be reached by data communication from outside of the mobile network;

using the external endpoint identifier of the edge application server, setup an application data flow between the edge application server and a remote server outside of the mobile network.

In accordance with a further aspect of the invention, a computer implemented method may be provided for setting up an application data flow between an edge application server which may be instantiated on one or more edge nodes of a mobile network and a remote server outside of the mobile network. The method may comprise:

obtaining an external endpoint identifier of an external endpoint of the edge application server from a mapping system on the basis of a client identifier of a client device which client device may be configured to utilize an edge application service of the edge application server, wherein the external endpoint may allow the edge application server to be reached by data communication from outside of the mobile network;

using the external endpoint identifier of the edge application server, setting up an application data flow between the edge application server and a remote server outside of the mobile network.

The above measures may be utilized in an edge computing context in which an edge application server may be instantiated on one or more edge nodes of a mobile network. Such an edge application server may for example be a software application or service which may instantiated on one edge node, or in a distributed manner on a number of edge nodes. The client device may be configured to utilize an edge application service provided by the edge application server, for example using an API. For that purpose, the client device may obtain an identifier of an endpoint of the edge application server. Here, the term 'endpoint' may refer to an interface exposed by the edge application server via which the client device may communicate with the edge application server, while the term 'identifier' (elsewhere also referred to as 'endpoint identifier') may refer to information which may allow the client device to locate the endpoint. For example, such an identifier may take the form of a uniform resource identifier (URI), a fully qualified domain name (FQDN) or an IP address. Since both the client device and the edge application server may be considered to be part of a same mobile network, this endpoint may also be referred to as an internal endpoint of the edge application server. On the basis of the (internal) endpoint, the client device may then communicate with the edge application server and utilize its edge application service, for example by transmitting application data to, or receiving application data from, the edge application server. It will be appreciated that the functionality described in this paragraph may be known per se from the technical field of edge computing.

It may be desirable to facilitate setting up an application data flow between the edge application server in the mobile network and a remote server outside of the mobile network. Here, the term "outside of the mobile network" may refer to the remote server not being part of the mobile network nor part of the transmission, compute and storage components supporting the mobile network, while still being able to access the mobile network. An example of such a remote server is another edge application server in another mobile network, or a cloud server. To allow setup of data connections to and/or from the edge application server, the above measures may configure the edge application server with an external endpoint via which external endpoint the edge application server may be accessible from outside of the mobile network, while at the same time making the external endpoint accessible to a network entity which is configured to setup such an application data flow between the edge application server and the remote server. An example of such a network entity is an application service provider's (ASP) server, which may elsewhere also be referred to as application provider (AP) server. To make the external endpoint accessible to the network entity, a mapping system may be provided which may provide the network entity with limited access to information from within the mobile network, namely by specifically providing access to the external endpoint, and in particular to an identifier of the external endpoint, while in some embodiments not providing access to various other types of information, such as information on the internal topology of the mobile network, information on physical locations of edge nodes, information on configuration and IP addressing of the mobile network, etc. In other words, the mapping system may provide selective access to the external endpoint and not provide access to, and thereby effectively hide, one or more of the above-mentioned types of other information.

The mapping system may be separate entity, in terms of hardware and/or software, and may itself maintain a mapping between, on the one hand an identifier of a client device, and on the other hand an identifier of the external endpoint of the edge application server which may be utilized, e.g., currently or in the near future, by the client device. Such a mapping may take form of a data structure which may, in any suitable manner, associate the identifier of the client device with the identifier of the external endpoint. Each type of identifier may be embodied in various ways, such as the aforementioned URI, FQDN or IP address. The mapping system may allow the endpoint identifier to be retrieved by the outside network entity via a communication interface and on the basis of the client identifier. The communication interface may for example be or use an API. The client identifier itself may be already known to the outside network entity. In the example of the outside network entity being an ASP's system, such as an ASP management and control system, the ASP system may be aware of the client identifier by virtue of managing and controlling the edge computing for various client devices which utilize the application managed and controlled by the ASP system. As such, the ASP system or other network entity may obtain access to the external endpoint on the basis of the client identifier. In some embodiments, access to the external endpoint may be restricted, for example by requiring the network entity to explicitly provide the client identifier in some form to the mapping system, or by allowing the network entity only access to external endpoints of select edge application servers, e.g., those servers managed and/or controlled by or for the network entity.

By being able to obtain the endpoint identifier from the mapping system, a network entity may thus set up application data flows to and/or from the edge application server, for example by setting up a connection between one edge application server's external endpoint in one mobile network to another edge application server's external endpoint in another mobile network. Accordingly, so-called multi-edge applications may be enabled, referring to applications which involve edges of different mobile networks. This may be particularly advantageous in case of applications which involve multiple users, which may have client devices connected to different mobile networks. It may also be advantageous in applications which are computationally and/or bandwidth demanding, since the computational load and/or bandwidth may be shared across the edges of the different mobile networks. The above measures also enable application data flows to be setup between the edge application server and a cloud server. This may also be advantageous in applications which are computationally and/or bandwidth demanding, or for applications in which at least part of the data processing does not need to take place near the client device.

Another advantage of the mapping system may be that such a mapping system may provide a communication interface via which only limited information may be accessible to an outside network entity. This may contribute to 'separation of concerns' between an operator of the mobile network and an application service provider, and may in general address security concerns. Namely, the mapping system may provide the endpoint identifier only on the basis of a client identifier. If an outside network entity is able to provide a client identifier of a client device, it may be considered to have legitimate interest in obtaining the endpoint identifier of the external endpoint of the edge application server utilized by the respective client device. Conversely, an outside network entity which is unable to provide a client identifier at any stage may be considered not to have legitimate interest in obtaining an endpoint identifier. The mapping system may also only provide access to specific information, e.g., only to endpoint identifiers, while not providing access to information which is not relevant, or not specific to, the edge application server utilized by the client device.

In an embodiment of the mapping system, the processor subsystem is configured to receive the external endpoint identifier and the client identifier from the edge application server. In accordance with this embodiment, the edge application server may thus supply the external endpoint identifier and the client identifier to the mapping system, for example just before, during, or after setup of a communication session with the client device. Namely, the edge application server may be aware of the client identifier from the communication session with the client device, or from the setup of such a session. An advantage of this embodiment may be that the client device itself may not need to supply its client identifier to the mapping system. This may reduce the number of steps needed for the mapping system to obtain all required information for generating the mapping between the client and endpoint identifiers.

In an embodiment of the mapping system, the processor subsystem may be configured to:

receive the client identifier and a server identifier from the client device;

receive an external endpoint identifier and a further server identifier from a support system with which support system the edge application server may have registered its external endpoint identifier; and determine that said received external endpoint identifier is the external endpoint identifier of the edge application server if the server identifiers match.

In accordance with this embodiment, the client device may supply its identifier to the mapping system, along with a server identifier identifying an edge application server used or to be used by the client device. To be able to identify the external endpoint of this server, the mapping system may further receive at least one endpoint identifier together with a server identifier from another network entity, namely a support system. Such a support system may be aware of the endpoint identifier, since edge application servers may register their endpoint identifiers with the support system. A nonlimiting example of such a support system may be the so-called Edge Enabler Server (EES), which may also further assist client devices in utilizing the edge application services. The mapping system may map the client identifier to the endpoint identifier if the server identifiers match. In other words, the client device may supply (A, B1) with A referring to the client identifier and B1 referring to a server identifier, while the support system may supply (C, B2) with C referring to the endpoint identifier and B2 referring to a server identifier; the mapping system may then generate a mapping associating A with C if B1 equals B2. Here, the term 'equal' may refer to both server identifiers referring to a same server; it will be appreciated that the exact type of server identifier may be different. For example, B1 may refer to an FQDN while B2 may refer to an IP address, while the mapping system may determine that both refer to the same server, e.g., by resolving the FQDN to the IP address on the basis of a DNS look-up. An advantage of this embodiment may be that the mapping system may be enabled to reconstruct the mapping from parts of information supplied by various parties while the parts of information may by themselves be insufficient to generate the mapping.

In an embodiment of the support system with which the edge application server may register its external endpoint identifier, the support system may be an Edge Enabler Server (EES). In an embodiment of the support system, the support system may comprise a network interface to the mobile network and a processor subsystem which may be configured to, using the network interface, perform any functionality, or any subset of functionality, as described elsewhere in this specification with reference to the support system, or specifically the EES. For example, the processor subsystem may be configured to obtain a combination of a server identifier of the edge application server and an external endpoint identifier of an external endpoint of the edge application server, for example by obtaining both identifiers from the edge application server itself. The processor subsystem may be further configured to provide the obtained server identifier and external endpoint identifier to the mapping system. In a further embodiment, a computer-implemented method may be provided which may correspond to actions or steps performed by the support system, or specifically the EES, as described in this specification. For example, the method may comprise obtaining a combination of a server identifier of the edge application server and an external endpoint identifier of an external endpoint of the edge application server, for example by obtaining both identifiers from the edge application server itself, and providing the server identifier and external endpoint identifier to the mapping system.

In an embodiment of the mapping system, the processor subsystem may be configured to select the external endpoint identifier of the edge application server from a number of external endpoint identifiers received from the support system by matching the server identifier received from the client device to a respective one of the number of server identifiers received from the support system. In accordance with this embodiment, the mapping system may receive pairs of endpoint identifiers and server identifiers, and may identify the endpoint identifier fora particular client device (referring to the endpoint identifier of the external endpoint of an edge application server utilized or to be utilized by the client device) on the basis of the client-supplied server identifier matching one of the support system-supplied server identifiers. Thereby, the mapping system may identify and generate a mapping between client identifier and end-point identifier even when receiving a number of endpoint identifiers.

In an embodiment of the mapping system, the communication interface may be configured to enable the network entity to at least one of:

register the client identifier with the mapping system to obtain a notification of the external endpoint identifier of the edge application server when the edge application service is utilized or is to be utilized by the client device; and query the mapping on the basis of the client identifier.

In accordance with this embodiment, the communication interface established by the processor subsystem may provide a network entity with either a push-type or a pull (or query)-type of access, or a combination of both. By enabling the network entity to register a client identifier with the mapping system, the network entity may register to receive a notification once an endpoint identifier is mapped to the client identifier by the mapping system, for example when the client device starts utilizing an edge application service. Alternatively, or additionally, the network entity may be enabled to query the mapping system via the communication interface whether an endpoint identifier is available for a particular client identifier. In both types of access mechanisms, the network entity may supply the client identifier to the mapping system and may subsequently receive an endpoint identifier, if available for the client identifier.

In an embodiment of the mapping system, the mapping system may be configured to communicate with another instance of the mapping system to exchange mapping data with the other instance of the mapping system. There may be different instances of mapping systems in different mobile networks, e.g., in different operator domains, which may together support multi-edge applications. For that purpose, the mapping systems may be configured to share and synchronize information on external endpoints of edge application servers with each other. A mapping system in one mobile network may thus have information on endpoint identifiers of edge application servers in another mobile network. An advantage of this embodiment may be that it may suffice for an application service provider to contact one mapping system to obtain information of the edge application servers in different mobile networks, thus without a need for separately contacting mapping systems in each of the different mobile networks.

It will be appreciated that any embodiment of the mapping system implies a corresponding embodiment of a corresponding method, and vice versa.

In an embodiment of the client device, the processor subsystem may be configured to provide the server identifier of the edge application server to the mapping system in form of an internal endpoint identifier of an internal endpoint of the edge application server, wherein the internal endpoint may be used by the client device for data communication with the edge application server inside of the mobile network. In accordance with this embodiment, the client device may provide a server identifier of the edge application server to the mapping system. While the server identifier may take various forms, the client device may in accordance with this embodiment specifically provide an identifier of an internal endpoint of the edge application server to the mapping system which may allow the mapping system identify the external endpoint of the edge application server, e.g., by using the internal endpoint identifier as a server identifier to match to an external endpoint identifier provided by a support system.

In an embodiment, the client device may comprise the mapping system as an internal subsystem. Communication between the client device and the mapping system as described in this specification may thus be internal communication.

It will be appreciated that any embodiment of the client device implies a corresponding embodiment of a corresponding method, and vice versa.

In an embodiment of the edge node or the system of edge nodes, the processor subsystem may be configured to provide an external endpoint identifier of the external endpoint together with a client identifier of the client device to a mapping system, which mapping system may be configured to generate mapping data associating the client identifier with the external endpoint identifier.

It will be appreciated that any embodiment of the edge node(s) implies a corresponding embodiment of a corresponding method, and vice versa.

In an embodiment, the remote server may be one of:

another edge application server of another mobile network; and a cloud server.

In an embodiment, the mobile network may be a mobile telecommunication network adhering to one or more 3GPP standards.

It will be appreciated by those skilled in the art that two or more of the above-mentioned embodiments, implementations, and/or aspects of the invention may be combined in any way deemed useful. Modifications and variations of any entity described in this specification, e.g., of any system, server, network entity, network node, device, method or computer program, which correspond to the described modifications and variations of another one of these entities may be carried out by a person skilled in the art on the basis of the present description.

FURTHER REFERENCES

[5] 3GPP TS 23.558 V1.1.0 (2020 October), Technical Specification, 3rd Generation Partnership Project; Technical Specification Group Services and System Aspects; Architecture for enabling Edge Applications; (Release 17)

BRIEF DESCRIPTION OF THE DRAWINGS

These and other aspects of the invention are apparent from and will be elucidated with reference to the embodiments described hereinafter. In the drawings.

Figure 1:
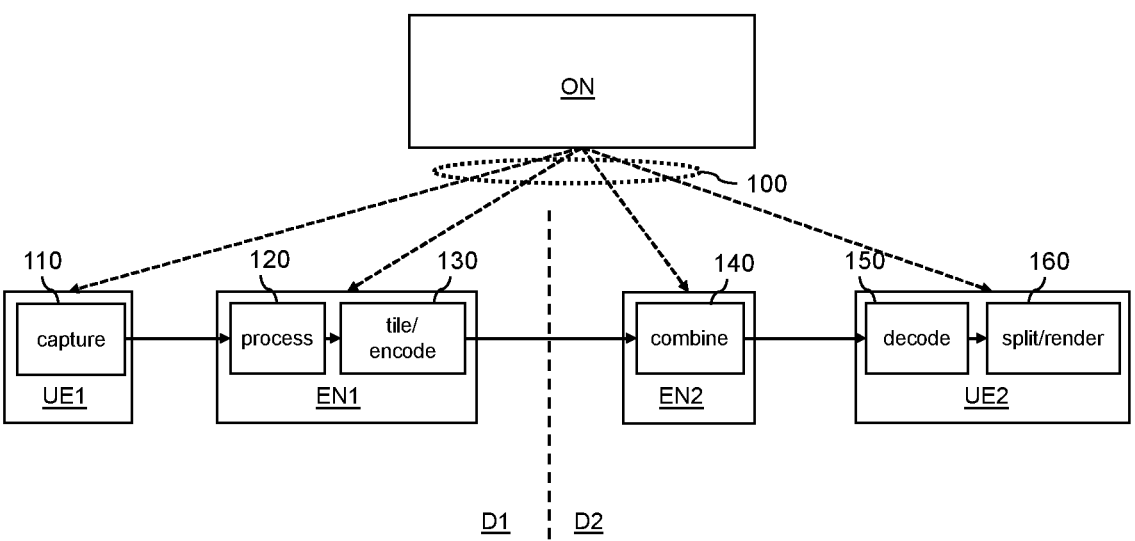
FIG. 1 shows an example of an edge-to-edge application data flow, in which two edge nodes in different domains establish a VR processing chain.

It should be noted that items which have the same reference numbers in different figures, have the same structural features and the same functions, or are the same signals. Where the function and/or structure of such an item has been explained, there is no necessity for repeated explanation thereof in the detailed description.

REFERENCE SIGNS LIST

The following list of references and abbreviations is provided for facilitating the interpretation of the drawings and shall not be construed as limiting the claims.

API application programming interface
APP application
APP-C application client
ASP application service provider
CMP cloud management platform
D(X) domain (X)
EAS(X) edge application server (X)
ECP edge computing platform
EEC edge enabler client
EES edge enabler server
EI(X) edge instance (X)
EN(X) edge node (X)
ON orchestration node
OP(X) operator platform (X)
UASM UE-EAS mapping system
UE(X) user equipment (X)
1-15 messages/steps in information flow
7'-9' messages/steps in information flow
7" messages/steps in information flow
5'''-8''' messages/steps in information flow
21-25 messages/steps in information flow
100 orchestration instruction
110 capture
120 process
130 tile/encode
140 combine
150 decode
160 split/render
200 northbound interface
210 east-westbound interface
220 southbound interface
230 user-network interface
240 APP APIs
300 internal endpoint
320, 322 external endpoint
340 data communication
360 previous serving EAS
370 new serving EAS
400 processor system representing mapping system, application service provider server or edge application server

410 network interface
420 processor subsystem
430 data storage
500 processor system representing client device
510 network interface
520 processor subsystem
530 data storage
540 camera interface
550 camera
600 computer-readable medium
610 non-transitory data
1000 exemplary data processing system
1002 processor
1004 memory element
1006 system bus
1008 local memory
1010 bulk storage device
1012 input device
1014 output device
1016 network adapter
1018 application

DESCRIPTION OF EMBODIMENTS

The following embodiments may involve facilitating setting up an application data flow between i) an edge application server which may be instantiated on one or more edge nodes of a mobile network and ii) a remote server which may be outside of the mobile network, such as another edge application server or a cloud server. In the following embodiments, the remote server is an edge application server outside of the mobile network. However, this is not a limitation, in that the remote server may also be a cloud server or any other type of remote server outside of the mobile network.

Example Involving VR Processing Chain

The desirability of such application data flows may be illustrated by way of the example shown in FIG. 1, in which a so-called Virtual Reality (VR) processing chain may be set up across edge nodes EN1, EN2 of different mobile networks, which may be considered as examples of different domains, being in this example D1 and D2.

In the example of FIG. 1, a client device UE1 may capture 110 a video of a user using a camera, which video is to be shown in a multiuser video conference in VR. The client device UE1 may transmit its captured video to an edge node EN1 of the mobile network D1. The edge node EN1 may process the received video, for example to remove a background of the user using a so-called background removal technique, encode the processed video as a tile using a so-called tiled encoding technique (also referred to as spatially segmented encoding), and transmit the encoded video to at least one other edge node EN2. This other edge node EN2 may be an edge node of another mobile network D2 to which another client device UE2 participating in the VR-based multiuser video conference may be connected. The other edge node EN2 may receive the video from the first edge node EN1, while additionally receiving videos from other edge nodes (not shown in FIG. 1). The other edge node EN2 may combine 140 the videos, which may each be received as respective tiles, into a single tiled video stream, and transmit the tiled video stream to the receiving client device UE2, which may in turn decode 150 the tiled video stream, split the decoded video stream into individual videos and render 160 the individual videos in a VR environment for display to a user. This example may involve an orchestration node ON orchestrating the VR processing chain, namely by sending orchestration instructions 100 to the respective entities involved in the VR processing chain. While not explicitly shown, such orchestration may involve arranging that the edge nodes EN1, EN2 are able to communicate with each other via data communication and setting-up the edge nodes EN1, EN2 to perform the respective tasks in the VR processing chain. In other words, it may be desirable for the orchestration node ON or another network entity to be able to set up edge-to-edge application data flows between the edge nodes EN1, EN2.

Architectural Considerations and Background

Figure 2:
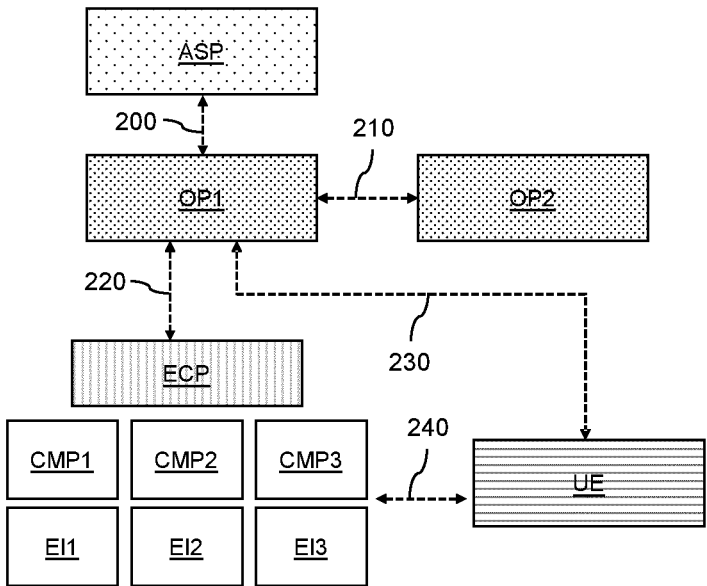
FIG. 2 shows the east/westbound interface between two operator platforms which each have edge instances that provide edge computing to client devices.

With continued reference to the background section of the present specification, architectures for edge computing have been developed by ETSI and in 3GPP and an effort has been made to integrate the results in a single architecture view, see Fig. C.2-1 of [5] (see 'further references'), which figure and definitions of the entities and interfaces shown therein are hereby incorporated by reference. It is said that this single architecture is to support UE-to-edge and edge-to-edge connections. However, besides stating a need for edge-edge connections, edge-to-edge connections are otherwise not addressed in this architecture. Meanwhile, the GSMA work on the Operator Platform (OP) [4] focusses on the federation of edge computing platforms of different mobile operators, with an important role for the east-westbound interface between the different OPs, as shown in FIG. 2. Here, an application service provider ASP is shown, which is to be understood as referring to a system of the ASP, such as a management and/or control system of an ASP, which system may be connected to an operator platform OP1 via a northbound interface 200. The operator platform OP1 may be connected to another operator platform OP2 via an east-westbound interface 210, via a southbound interface 220 to an edge computing platform ECP, and via a user-network interface 230 to a client device UE. The client device UE may be connected to entities of the edge computing platform ECP via an application API. These entities may include cloud management platforms CMPs, which may interact with the edge computing platform, and edge instances EI, with the latter referring to instances of edge application servers on respective edge node(s).

As illustrated in FIG. 2, the ASP may typically have a relation with one OP, which OP may be provided by one mobile network operator. The footprint of the application managed and/or controlled by the ASP may be extended across other OPs (typically provided by other mobile network operators) by federation through the aforementioned east-westbound interface 210. Thus, in FIG. 2, the ASP may not need to have a direct relation with OP2. However, while [4] states that the east-westbound interface 210 may be used for control/provisioning of edge federation, it may not be used for application traffic, which is defined by [4] as "the application traffic as such flows between the application software at the user device and the application software deployed in the edge nodes". Accordingly, a different way may be desired to set up application data flows between edge instances, including edge application servers that have been instantiated as edge instances, in different mobile networks.

The following embodiments may involve enabling a network entity, such as a management and/or control system of an ASP, to obtain an external endpoint identifier of an external endpoint of an edge application server utilized by a client device, via which external endpoint the edge application server may be reachable from outside of a mobile network. The network entity may obtain and use this external endpoint identifier to setup data connections to/from the edge application server, for example application data connections related to applications offered to individual client devices. To make the external endpoint identifier available to the ASP, a mapping system may be provided which may maintain a mapping between client devices and edge application servers, and more specifically, between identifiers of client devices and the identifiers of external endpoints of edge application servers utilized by the respective client devices. This mapping may be made selectively accessible to the network entity, while in some embodiments hiding the remainder of the network topology from the network entity, e.g., by not providing access to such information.

By way of example, the client device in the following embodiments may be a so-called User Equipment (UE) of a mobile network which adheres to one or more 3GPP standards. Likewise, the following embodiments may refer to various network entities of such a 3GPP-type of mobile network. However, it will be appreciated that the concepts and mechanisms described in this specification may equally apply to any other type of client device and network entities, which may include client devices for use with, and network entities of, non-3GPP mobile networks or fixed networks.

Mapping System to Enable ASP to Identify External Endpoint of EAS

Figure 3:
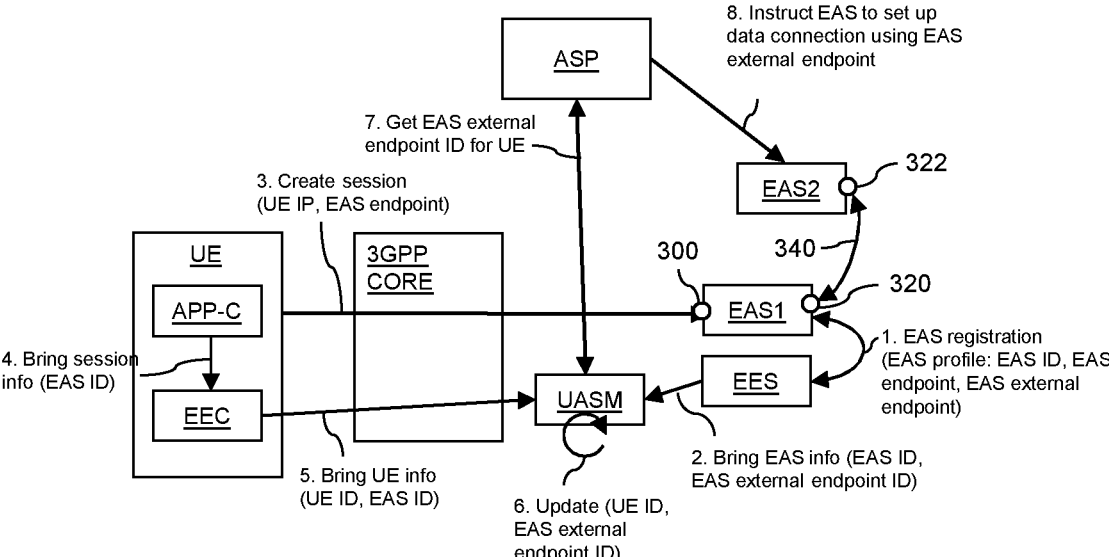
FIG. 3 shows an information flow by which an ASP system is informed of an external endpoint of an edge application server utilized by a client device.

FIG. 3 shows an information exchange by which an ASP's system (which is in FIG. 3 and elsewhere simply shown and referred to as 'ASP') may be informed of an external endpoint of an edge application server (EAS) utilized by a client device. In this and following embodiments, reference may be made to the 3GPP edge application architecture and terminology, see [5]. In this embodiment:

The client device (UE, User Equipment) may be registered on a 3GPP core network, for example via a Radio Access Network (RAN, not shown in in the Figures) which core network may provide connectivity between the UE and edge application servers. The UE may be uniquely identified by a UE identifier (ID), for example a Generic Public Subscription Identifier (GPSI) or an Edge UE ID.

The edge server architecture may comprise one or more Edge Application Servers (EASs) which provide edge applications services. The EASs may register on an Edge Enabler Server (EES) so that the EES may maintain an overview of the EASs and their applications services. The EASs may be identified by EAS IDs.

The UE may comprise an Edge Enabler Client (EEC) which may have registered with the EES so that the UE's EEC may discover through the EES which EASs are available and which EAS endpoints to use for connecting to an EAS. This mechanism may be used to find an EAS endpoint 300 for a UE-EAS connection.

The UE may have an Application Client (APP-C), which may be an application that the Application Service Provider (ASP) wishes to run on the client. The Application Client may exchange information with the EEC over an EDGE-5 interface.

The ASP may provide, through a provisioning mechanism such as one from ETSI MEC [2], the application service that is to be instantiated on the EASs.

The information exchange may involve the following steps, which steps may correspond to respectively numbered arrows in FIG. 3 and other figures:

1. As a part of the EAS registration with the EES according to 3GPP TS 23.558 [5], section 8.4.3.2.2, an EAS (EAS1) may provide an additional information element, namely an identifier of the EAS' external endpoint 320, which external endpoint may be the endpoint that the ASP may use for setting up external connections to the EAS1. The EAS external endpoint may be identified by an external endpoint identifier, which may for example be a URI (Uniform Resource Identifier).

2. The EES may provide the combination of the EAS ID and the EAS external endpoint ID to a mapping system, which mapping system may here and elsewhere also be referred to as UE-EAS mapping system (UASM).

3. The UE may set up an application data connection between the UE and the EAS1. This connection may end at the EAS endpoint 300 (which may elsewhere also be referred to as 'internal' endpoint to distinguish from an EAS' external endpoint).

4. In the UE, the Application Client APP-C may inform the EEC that a new data connection has been created and which EAS, identified by its EAS ID, is involved.

5. The EEC in the UE may provide the combination of the UE ID, for example the Generic Public Subscription Identifier (GPSI), and the EAS ID of the EAS to which it may be connected to, to the UASM.

6. The UASM may maintain a mapping between UE IDs and EAS' external endpoint IDs, and may update the mapping based on the information provided by the UE. This mapping may be used for identifying the EAS external endpoint to be used for application data connections to and/or from the EAS serving a particular UE.

7. The ASP may obtain the identifier of the EAS external endpoint for a given UE for which the ASP may wish to setup an application data connection (for example, to support an edge-edge application data flow, or for an edge-cloud data flow), for example by querying the UASM on the basis of the UE ID.

8. The ASP may instruct another EAS (EAS2) to set up an application data connection 340 to EAS1 using EAS1's external endpoint 320. The external endpoint 322 of EAS2 may be obtained by the ASP following the same steps 1-6. As will also be elucidated elsewhere in this specification, if EAS2 is located in another mobile domain than EAS1, these steps 1-6 may take place in the other mobile domain.

Entities and Identifiers

To enable the above information exchange, existing 3GPP entities may be provided with new functionality. For example:

The EEC as part of the UE may be provided with a new function to inform the UASM of the new (UE ID, EAS ID) combination, for example based on information received from the Application Client APP-C. This new function may be included in the EEC, or included in the UE as a new, possibly separate, function.

The UASM may be newly provided to generate and maintain the (UE ID, EAS external endpoint ID) mapping. This function may be located and combined with other functions in the 3GPP and/or ETSI MEC architectures.

The ASP may become aware of the UASM and its connectivity details (e.g., URI, FQDN, IP address) through a management system, for example the Operation Support System (OSS) in the ETSI MEC architecture [2]. For example, the ASP may receive such types of information as a part of the service level information through a Customer Facing Service (CFS) Portal linked to the OSS.

In general, the EAS external endpoint identifier may be carried in as an information element in the EAS registration with the EES. The EAS external endpoint identifier may take different forms, e.g. a Uniform Resource Identifier (URI), a Fully Qualified Domain Name (FQDN) or an IP address. The EAS external endpoint itself may be provisioned in the EAS by a management system, e.g., the MEC Platform Manager in the ETSI MEC architecture [2]. Once provisioned on the EAS, the EAS external endpoint identifier may be included in the EAS profile described in 3GPP TS 23.558 [5], Table 8.2.4-1: Edge Application Server Profile, for informing other functions and elements in the architecture, such as the EES, of the EAS external endpoint associated with the EAS in question.

Mapping System (UASM) and Mapping Data

The UASM, or in general the mapping system, may maintain the mapping between a UE identifier and an EAS external endpoint identifier in any suitable manner, for example by using a data structure which associates a first data entry containing a UE identifier with a second data entry containing an EAS external endpoint identifier. The data structure may for example represent a database or a table. The data structure may be queryable, for example by the UASM or by the ASP via a communication interface. A non-limiting example of such a communication interface is an API made available to the ASP. As will be explained with reference to 'additional parameters in mapping', the data structure may contain various additional types of parameters.

In some embodiments, the mapping system may be referred to as an 'association system' by associating the UE ID with the EAS external endpoint identifier. In other embodiments, the mapping system may be referred to as a 'translation system' by enabling translation from the UE ID to the EAS external endpoint identifier. In other embodiments, the mapping system may be referred to as a 'lookup system' by enabling a lookup of the EAS external endpoint identifier on the basis of the UE ID. In other embodiments, the mapping system may be referred to as a 'resolver system' by enabling a resolving of the EAS external endpoint identifier on the basis of the UE ID.

Multiple Operator or Edge Computing Domains

In use cases involving multiple mobile operators or edge computing providers, both being examples of different domains, there may be respective instantiations of the UASM in each of the domains, while the UASMs from the different domains may be linked and configured to exchange mapping information. Thereby, the UASMs may exchange information on how UEs map to EAS external endpoints. Such information exchange may support edge-edge application data connections between edges that are in different domains. This may be particularly relevant for the GSMA OP architecture, in which the ASP may be in contact with only one OP (e.g., mobile network operator with edge computing resources) and this one OP may need to inform the ASP of the external endpoints of edge application servers in other OPs.

Figure 4:
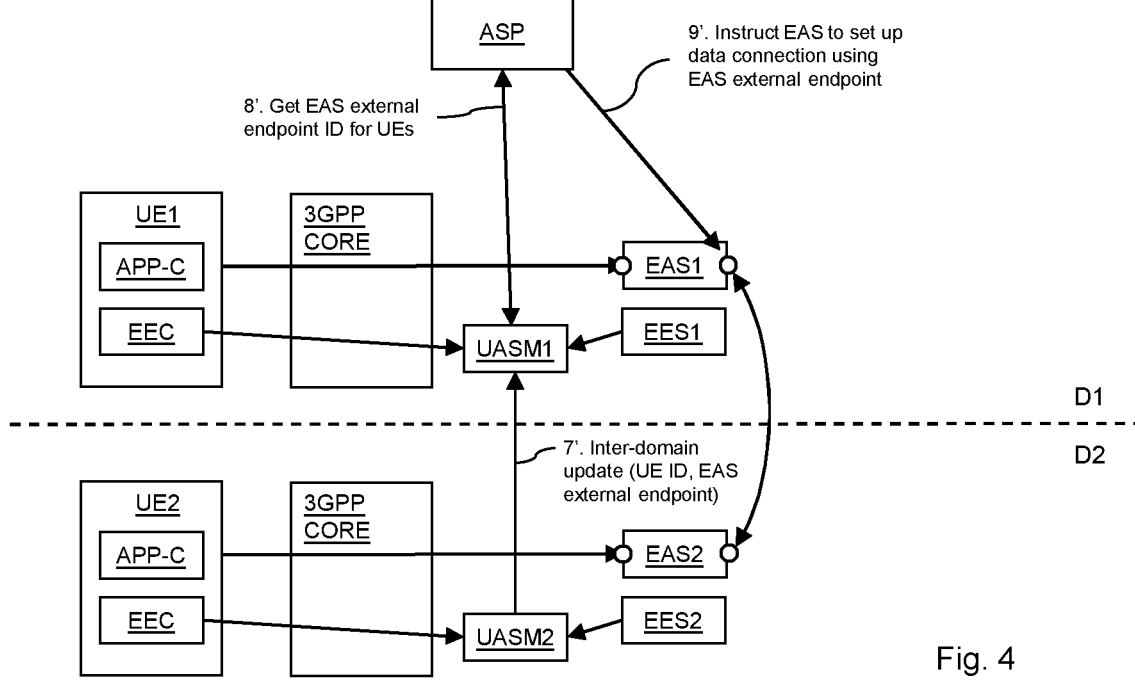
FIG. 4 shows an exchange of mapping information between UASMs in different domains to support of edge-edge application data flows across the domains.

The exchange of mapping information between domains is shown in FIG. 4 for a situation with two domains, D1, D2. In each domain, steps 1 through 6 as described with reference to FIG. 3 may be carried out to determine to the UE-EAS external endpoint mappings in each domain. In a following step 7' shown in FIG. 4, the mapping information from domain D2 may be passed to domain D1 through a connection between UASM1 and UASM2. Different mechanisms may be used here. For example, a push mechanism from UASM2 in domain D2 to UASM1 in domain D1 may have the effect that changes in the UE ID-EAS endpoint ID mapping, e.g., due to UE mobility, may be quickly transferred and made available in domain D1. A periodic pull mechanism from UASM1 in domain D1 may have the effect that the number of messages may be reduced by aggregating updates for several UEs in one message.

In some examples, the exchange of mapping information between the domains may also may take the EAS provider identifier into account, or an identifier of the ASP, for example to restrict the exchange of information to mapping data which relates to EAS providers or ASPs that make use of edges in both domains. This way, updates of mappings that are not relevant to the ASPs in one domain may be left out.

With continued reference to FIG. 4, in step 8', the ASP may query UASM1 in domain D1, being the domain that the ASP is connected to, identify the UE-EAS external endpoint mapping for both UEs, e.g., UE1 in domain D1 and UE2 in domain D2. In step 9', the ASP may instruct the application on EAS1 in domain D1 to set up a cross-domain application data connection with EAS2 in domain D2.

Figure 5:
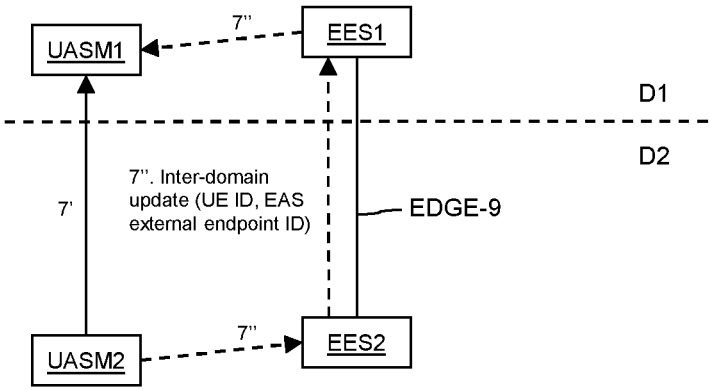
FIG. 5 shows an exchange of mapping information between UASMs in different domains via EESs and EDGE-9 interface.

Use of EDGE-9 Interface for Information Exchange Between Multiple Operator or Edge Computing Domains In a situation with multiple operator or edge computing domains, as described with reference to FIG. 4, the information exchange between UASMs in such different domains may also be achieved by using the EDGE-9 interface between EESs as described in TS 23.558 [5], section 6.4.10. This is also illustrated in FIG. 5, where instead of a direct UASM-UASM information exchange as described in FIG. 4 with reference to numeral 7', the information exchange 7" in FIG. 5 passes between EES1 and EES2 and the EDGE-9 interface between the EESs. Note that for comparison purposes, FIG. 5 also shows the previous direct information exchange 7'. Compared to this direct information exchange, the use of the EDGE-9 interface may reduce the number of cross-domain control interfaces, which may be a desirable architecture goal.

UASM as a Part of Existing Functions in the Network

Another approach to reduce the number of functions and interfaces within and across domains may be to include the UASM in an existing function in the 3GPP or ETSI MEC architecture. For example, the UASM may be included in an existing EES function (described in 3GPP TS 23.338 [5]) or in an existing function in the ETSI MEC Platform (described in ETSI GS MEC 003 [2]).

UASM as a Part of a UE

Figure 6:
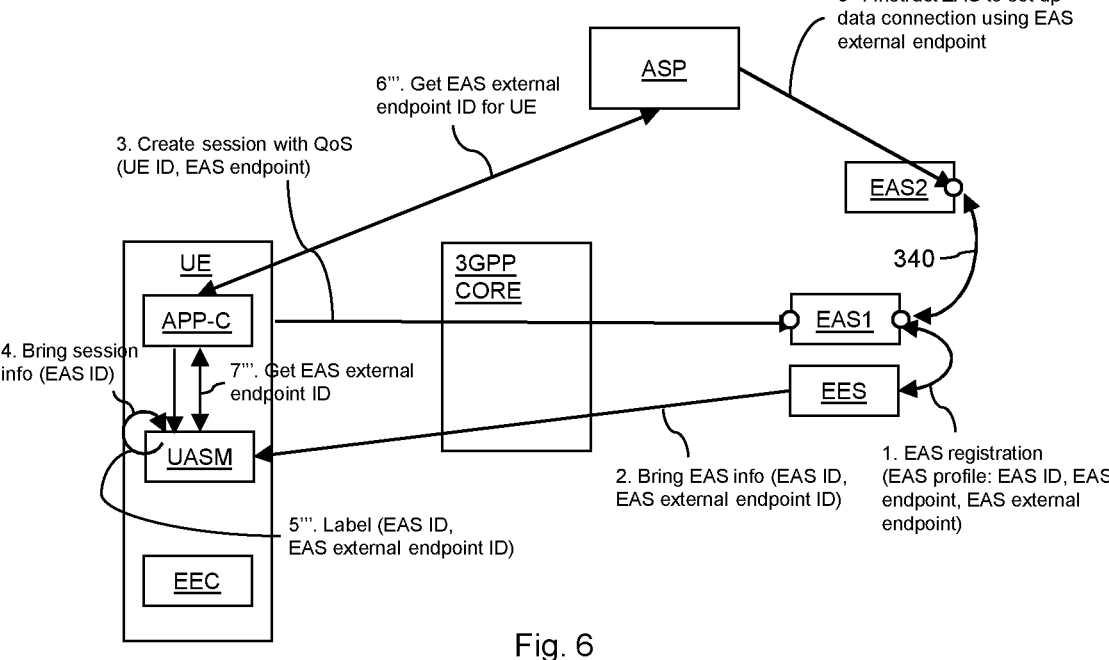
FIG. 6 shows an information flow when the UASM is part of the UE.

FIG. 6 shows an information flow for an embodiment in which the UASM may be part of the UE. Here, the UASM may be specific for a particular UE. This may lead to the UASM having only to maintain a smaller mapping table, e.g., specifically for that UE. In such an example, queries of the ASP for an external endpoint of an EAS may be directed to the UE. As a single UE may have different application clients, possibly connected to different EASs, the mapping table may include additional parameters, such as those described with reference to "additional parameters in mapping". FIG. 6 shows the steps in the information flow. Here, steps 1-4 may correspond to the same steps as in FIG. 3. In step 5''', the (EAS ID, EAS external endpoint ID) combination associated with the EAS ID which is indicated by the UE's Application Client APP-C may be labeled in the UASM as being in use. In step 6''' and 7''', the ASP may query, through the UE's Application Client, the UE's UASM to determine the EAS external endpoint for the EAS (to be) utilized by the client device.

Additional Parameters in Mapping

The core mapping between UE ID and EAS external endpoint ID, which may be maintained by the UASM or in general the mapping system, may be complemented with additional information which may be useful for the ASP and which may support refinements of the mechanisms in the other embodiments.

| Core mapping | | Additional parameters |
|---|---|---|
| Between: | and: | One or more of: |
| UE ID e.g., Generic Public Subscription Identifier (GPSI), Application Client ID (ACID), Edge UE ID | EAS external endpoint ID e.g., Uniform Resource Identifier (URI), Fully Qualified Domain Name (FQDN), IP address | Secondary EAS external endpoint ID Timestamp of mapping creation Time interval for validity Time of expiry |

In a situation where a UE may be related to edge applications of different ASPs, the EAS provider identifier may be included in the mapping. As shown below, the mapping information may be dependent on the EAS provider identifier:

| Core mapping | | | Additional parameters |
|---|---|---|---|
| Between: | | and: | One or more of: |
| UE ID | EAS provider identifier | EAS external endpoint ID | Secondary EAS external endpoint ID Timestamp of mapping creation Time interval for validity Time of expiry |

This way, the mapping to and from the EAS external endpoint ID may depend on both the UE ID and the EAS provider identifier. This may be useful in cases where different ASPs may have edge applications running on different EASs.

Information Exchange Between ASP and UASM

The ASP, or another network entity, may exchange information with the UASM to determine the EAS external endpoint for a given UE. The information exchange may for example be implemented as a push mechanism, where the UASM may inform the ASP when a new (UE ID, EAS external endpoint ID) mapping becomes available. In such a push mechanism, the ASP may be enabled to register with the UASM for one or more UE IDs that the ASP seeks to be informed of. The information exchange may also be implemented as a pull mechanism, where the ASP may be enabled to query the UASM when the ASP seeks the EAS external endpoint for a given UE. The registration (in the push mechanism) and the query (in the pull mechanism) may be carried out for individual UE IDs, or for sets UE IDs, potentially using range delimiters or wildcards to efficiently capture large ranges of UEs. Instead of or in addition to a push mechanism and/or a pull mechanism, the ASP may be enabled to download mapping data related to EASs which are managed and/or controlled by the ASP. This may be possible by filtering on EAS provider identifier in the mapping. It is noted that in the above, the phrasing 'ASP enabled to' may refer to the UASM being appropriately configured to support such push, query or download mechanism.

Instead of or in addition to determining the EAS external endpoint ID for a given UE ID, the ASP may also make reverse queries to the UASM, and the UASM may be configured to support such reverse queries. For example, the ASP may query for all UE IDs which are mapped to a specific EAS ID. This reverse query may give an indication of groups of UE that are relatively close together in network topology and, following the rationale of edge computing, potentially also geographically.

EAS External Endpoint Resolving to Existing Endpoint

In some embodiments, a name or other identifier for the EAS external endpoint may be resolved to an identifier routing to an existing endpoint. For example, the EAS external endpoint ID that may be sent to the ASP may be an ID that may be resolved in the mobile operator or edge computing domain via standard DNS mechanisms to the IP address of an existing EAS endpoint, e.g., an endpoint used for connections between the UE and the EAS which is also addressable from outside of the mobile network. This may keep the desired separation of concerns at the URI level while simplifying the IP addressing by reducing the number of IP addresses.

Handover to Another EAS

Figure 7:
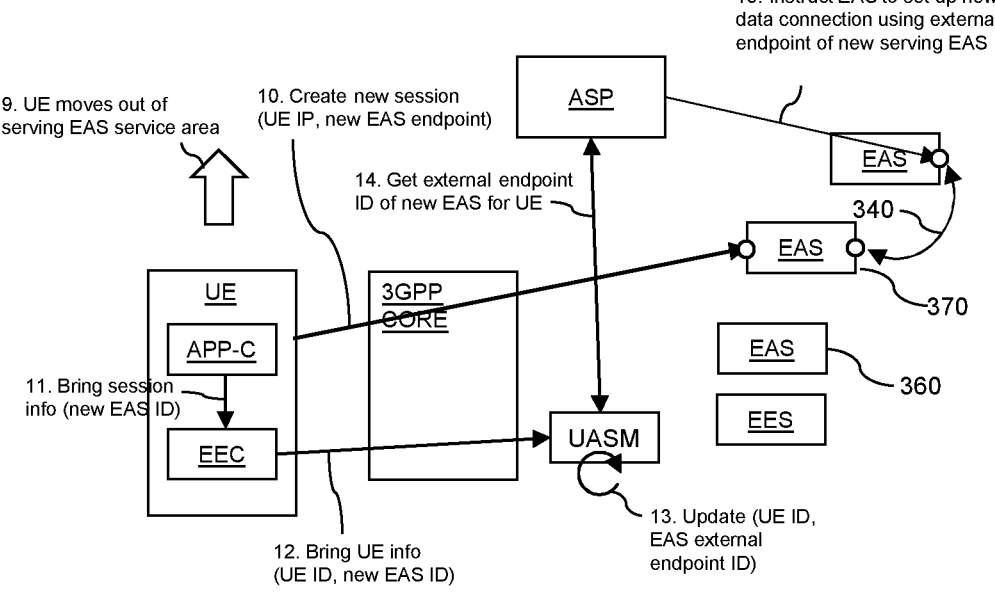
FIG. 7 shows an information flow involving the UASM informing the ASP of new serving EAS after a UE mobility event.

The UASM may play a role in reducing or avoiding interruption of applications in case of UE mobility events that cause a handover of a UE to a different EAS. Previously, an ASP may have had no straightforward method to determine that a new EAS external endpoint is to be used for edge-edge or ASP-edge application data connections after a UE mobility event. The UASM may provide this information, using an approach similar to that of the FIG. 3 embodiment. Namely, FIG. 7 shows the UASM informing the ASP of a new serving EAS 370 after a UE mobility event.

This embodiment may involve the following steps, which may follow steps 1-8 of the FIG. 3 embodiment:

9. The UE may move out of the service area of a current serving EAS 360. This mobility event may trigger an application context relocation (e.g., as described in TS23.558 [5], section 8.8.2). As a result of the application context relocation, the Application Client APP-C and the EEC may select a new serving EAS and, if needed, an application context transfer between the current and the new (target) serving EAS may be performed. Such application context transfer may be known per se.

10. The UE may set up an application data connection between the UE and the new serving EAS 370.

11. The Application Client APP-C in the UE may inform the EEC in the UE that a new data connection has been created and which EAS may be involved. The EAS may be identified based on its EAS ID.

12. The EEC in the UE may provide a combination of the UE ID, for example the Generic Public Subscription Identifier (GPSI), and the EAS ID of the new serving EAS that the UE connected to in the previous step.

13. The UASM may update the mapping of UE IDs to EAS external endpoint IDs, which may be maintained by the UASM, to account for the new serving EAS.

14. The ASP may obtain the identifier of the EAS external endpoint for a given UE for which the ASP seeks an application data connection to be set up (for example, to support an edge-edge application data flow, or for an edge-cloud data flow). As also discussed elsewhere, this may be implemented by a push mechanism, in which the UASM pushes the updated information to the ASP for the UEs for which the ASP has subscribed to for this type of information. Accordingly, the ASP may be notified of a new EAS external endpoint after a UE mobility event.

15. The ASP may instruct another EAS to set up an application data connection 340 using the external endpoint of the new serving EAS 370.

EAS Initiated Session Setup

Figure 8:
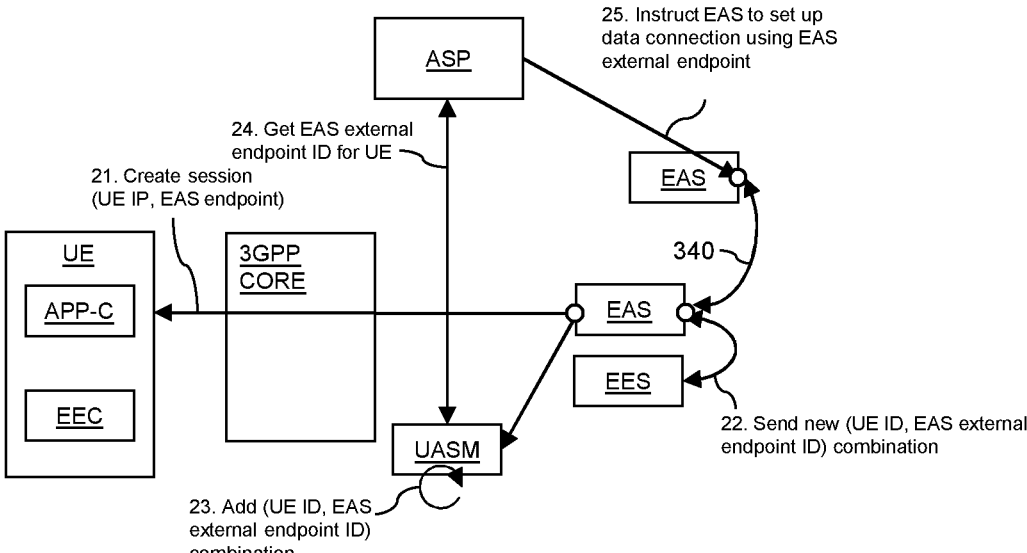
FIG. 8 shows an information flow for a simplified UASM and for the case that an EAS sets up an application data connection to the UE.

FIG. 8 shows a simplified information flow compared to the FIG. 3 embodiment for cases where the EAS may set up an application data connection to the UE. Namely, in cases where the EAS initiates the setup of the application data connection to the UE, the information flow of FIG. 3 may be simplified. In this embodiment, the mapping function may obtain the (UE ID, EAS external endpoint ID) combinations directly from the EAS. Despite the EAS having the components of the mapping data already, it may still be useful to have the mapping data maintained by a separate function, e.g., the UASM, as the ASP may not necessarily have application data connectivity to all EASs. Furthermore, a separate UASM may be needed to support inter-domain embodiments as connecting all EASs in one domain to all EASs in another domain may be not scalable and may likely violate requirements for the separations of concerns and topology hiding between domains.

The steps in the FIG. 8 embodiment may be:

21. The EAS may setup an application data connection to the UE. This step may be according to 3GPP TS 23.558 [5], section 8.6.6.2.2.

22. After successful establishment of the connection, the EAS may send the associated (UE ID, EAS external endpoint ID) combination to the UASM.

23. The UASM may store the new <UE ID, EAS external endpoint ID> combination as mapping data.

24. The ASP may obtain the EAS external endpoint ID for a given UE for which the ASP may desire an application data connection to be set up (for example, to support an edge-edge application data flow, or for an edge-cloud data flow).

25. The ASP may instruct the EAS to set up the application data connection using the EAS external endpoint.

Figures 9, 10, 11:
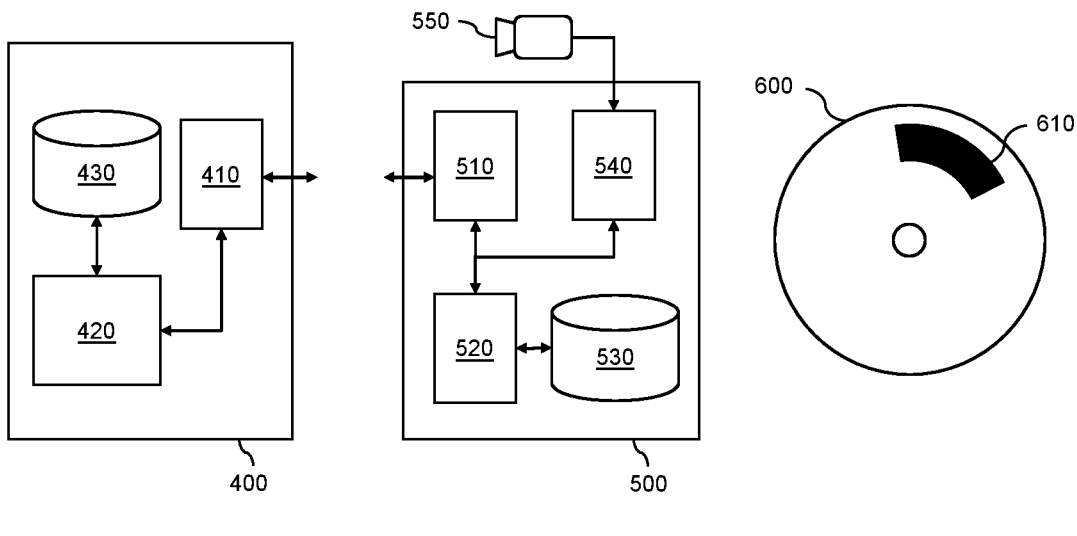
FIG. 9 shows a processor system which may be exemplary for a mapping system, an application service provider system or an edge application server.
FIG. 10 shows a processor system which may be exemplary for a client device.
FIG. 11 shows a computer-readable medium comprising non-transitory data.

FIG. 9 shows a processor system 400 which may be exemplary for the mapping system (e.g., the UASM), an application service provider (ASP) system or an edge application server (EAS), meaning that the processor system 400 may embody either of these entities. The processor system 400 may comprise a network interface 410 for data communication via a network (not shown itself). The network interface 410 may for example be a wired communication interface, such as an Ethernet or fiber-optic based interface. The network may for example be a mobile network, with the processor system 400 being part of and connected to a fixed (e.g., non-mobile) part of the mobile network. Alternatively, the network interface 410 may be a wireless communication interface, e.g., being of a type as described below for the client device 500 of FIG. 10. In other examples, the processor system 400 may be a subsystem of a larger system, e.g., a supra-system. In such cases, the network interface 410 may be an internal interface of the supra-system, for example a virtual, software-based network interface.

The processor system 400 may further comprise a processor subsystem 420 which may be configured, e.g., by hardware design or software, to perform the operations described in this specification in as far as pertaining to the entity that the processor system is embodying, e.g., the mapping system, the ASP system or the edge application server. In general, the processor subsystem 420 may be embodied by a single Central Processing Unit (CPU), such as a x86 or ARM-based CPU, but also by a combination or system of such CPUs and/or other types of processing units. In embodiments where the processor system 400 is distributed over different entities, e.g., over different servers, the processor subsystem 420 may also be distributed, e.g., over the CPUs of such different servers. As also shown in FIG. 9, the processor system 400 may comprise a data storage 430, such as a hard drive, a solid-state drive or an array of such hard and/or solid-state drives, etc., which may be used to store data. In some examples, the processor system 400 may be implemented by a network node or a system of network nodes. In some examples, the processor system 400 may implement a network function which in turn may represent the mapping system, the application service provider system or the edge application server.

It is noted that while the processor system 400 is described above as in some embodiments embodying an application service provider (ASP) system, the processor system 400 may alternatively embody any other network entity which may be configured to utilize a communication interface of the mapping system to obtain an external endpoint identifier on the basis of a client identifier.

FIG. 10 shows a processor system 500 which may be exemplary for the client device described in this specification, and which may in the following also be simply referred to as client device 500. The client device 500 may comprise a network interface 510 to a network so as to be able to communicate with an edge application server via data communication. The edge application server may be part of an edge of the same (mobile) network to which the client device 500 may be connected. The network interface 510 may for example be a wireless communication interface, which may also be referred to as a radio interface, and which may be configured to connect to the mobile network's infrastructure. In some examples, the network interface 510 may comprise a radio and an antenna, or a radio and an antenna connection. In a specific example, the network interface 510 may be a 4G or 5G radio interface for connecting to a 4G or 5G mobile network adhering to one or more 3GPP standards, or a Wi-Fi communication interface for connecting to a Wi-Fi network infrastructure, etc. In other examples, the network interface 510 may be a wired communication interface, for example of a type as described for the processor system 400 of FIG. 9.

The client device 500 may in some embodiments further comprise a sensor interface 540 via which the processor system 500 may acquire sensor data from a sensor 550, such as a camera. The sensor data may for example be acquired in (near) real-time for being streamed in (near) real-time to the edge application server for further processing. Such acquired sensor data may represent, or may be part of, application data which is to be processed by the edge application server. In other embodiments, the client device 500 may comprise the sensor 550 as an internal component.

The client device 500 may further comprise a processor subsystem 520 which may be configured, e.g., by hardware design or software, to perform the operations described in this specification in as far as pertaining to a client device or UE. In general, the processor subsystem 520 may be embodied by a single Central Processing Unit (CPU), such as a x86 or ARM-based CPU, but also by a combination or system of such CPUs and/or other types of processing units, such as Graphics Processing Units (GPUs). The client device 500 is further shown to comprise a data storage 530 which may be of a same or similar type as described for the processor system 400 of FIG. 9, and which may be used by the client device 500 to store data, for example to store data to be sent to, or received from, the edge application server.

Although not explicitly shown in FIG. 10, the client device 500 may further comprise a display output for outputting display data to a display. This may enable the client device to display data, such as acquired sensor data or a data stream which is received (back) from the edge application server. Such a received data stream may for example be a processed version of the data stream which is sent to the edge application server. In a specific example, the client device 500 may acquire and send a camera data stream to the edge application server, which edge application server may render the camera data stream and other camera data streams in a virtual environment and send a data stream representing the rendered virtual environment back to the client device 500 for display thereon.

In general, the client device 500 may be embodied by a (single) device or apparatus, e.g., a smartphone, personal computer, laptop, tablet device, gaming console, set-top box, television, monitor, projector, smart watch, smart glasses, media player, media recorder, etc. In some examples, the client device 500 may be a so-called User Equipment (UE) of a mobile telecommunication network, such as a 5G or next-gen mobile network. In some examples, the client device 500 may be embodied by a distributed system of devices, or may represent a virtual, software-based, client.

In general, each entity described in this specification may be embodied as, or in, a device or apparatus. The device or apparatus may comprise one or more (micro)processors which execute appropriate software. The processor(s) of a respective entity may be embodied by one or more of these (micro)processors. Software implementing the functionality of a respective entity may have been downloaded and/or stored in a corresponding memory or memories, e.g., in volatile memory such as RAM or in non-volatile memory such as Flash. Alternatively, the processor(s) of a respective entity may be implemented in the device or apparatus in the form of programmable logic, e.g., as a Field-Programmable Gate Array (FPGA). Any input and/or output interfaces may be implemented by respective interfaces of the device or apparatus. In general, each functional unit of a respective entity may be implemented in the form of a circuit or circuitry. A respective entity may also be implemented in a distributed manner, e.g., involving different devices or apparatus.

It is noted that any of the methods described in this specification, for example in any of the claims, may be implemented on a computer as a computer implemented method, as dedicated hardware, or as a combination of both. Instructions for the computer, e.g., executable code, may be stored on a computer-readable medium 600 as for example shown in FIG. 11, e.g., in the form of a series 610 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 11 shows by way of example an optical storage device 600.

In an alternative embodiment of the computer-readable medium 600, the computer-readable medium 600 may comprise transitory or non-transitory data 610 in the form of a data structure representing mapping data described in this specification.

Figure 12:
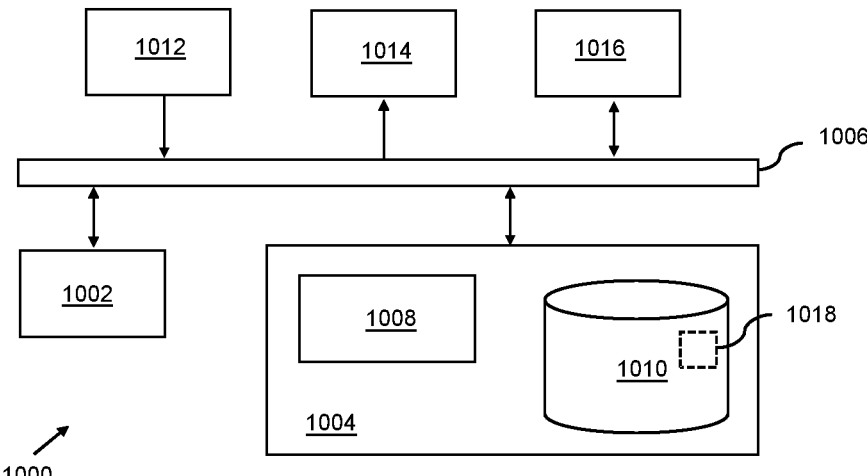
FIG. 12 shows an exemplary data processing system.

FIG. 12 is a block diagram illustrating an exemplary data processing system 1000 that may be used in the embodiments described in this specification. Such data processing systems include data processing entities described in this specification, including but not limited to the mapping system (e.g., the UASM), the application service provider system or the edge application server, or in general a network entity as described in this specification. The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 12, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a mapping system or UASM as described in this specification. In that case, application 1018 may represent an application that, when executed, configures data processing system 1000 to perform the functions described with reference to the mapping system or UASM. In another example, data processing system 1000 may represent an application service provider system as described in this specification. In that case, application 1018 may represent an application that, when executed, configures data processing system 1000 to perform the functions described with reference to the application service provider system. In yet another example, data processing system 1000 may represent an edge application server as described in this specification. In that case, application 1018 may represent an application that, when executed, configures data processing system 1000 to perform the functions described with reference to the edge application server. Data processing system 1000 may also represent a client device or UE as described in this specification. In that case, application 1018 may represent an application that, when executed, configures data processing system 1000 to perform the functions described with reference to the client device or UE.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A mapping system for facilitating setup of an application data flow between an edge application server which is instantiated on one or more edge nodes of a mobile network and a remote server outside of the mobile network, the mapping system comprising:

a network interface to the mobile network;

a processor subsystem configured to, using the network interface:

obtain a client identifier identifying a client device configured to utilize an edge application service of the edge application server;

obtain an external endpoint identifier of an external endpoint of the edge application server, wherein the external endpoint allows the edge application server to be reached by data communication from outside of the mobile network;

generate mapping data associating the client identifier with the external endpoint identifier; and using the mapping data, provide a communication interface to enable a network entity which is configured to setup the application data flow between the edge application server and the remote server to obtain the external endpoint identifier on the basis of the client identifier.

2. The mapping system according to claim 1, wherein the processor subsystem is configured to receive the external endpoint identifier and the client identifier from the edge application server.

3. The mapping system according to claim 1, wherein the processor subsystem is configured to:

receive the client identifier and a server identifier from the client device;

receive an external endpoint identifier and a further server identifier from a support system with which support system the edge application server has registered its external endpoint identifier; and determine that said received external endpoint identifier is the external endpoint identifier of the edge application server if the server identifiers match.

4. The mapping system according to claim 3, wherein the processor subsystem is configured to select the external endpoint identifier of the edge application server from a number of external endpoint identifiers received from the support system by matching the server identifier received from the client device to a respective one of the number of server identifiers received from the support system.

5. The mapping system according to claim 1, wherein the communication interface is configured to enable the network entity to at least one of:

register the client identifier with the mapping system to obtain a notification of the external endpoint identifier of the edge application server when the edge application service is utilized or is to be utilized by the client device; and query the mapping system on the basis of the client identifier.

6. The mapping system according to claim 1, wherein the mapping system is configured to communicate with another instance of the mapping system to exchange mapping data with the other instance of the mapping system.

7. An application service provider system for setting up an application data flow between an edge application server which is instantiated on one or more edge nodes of a mobile network and a remote server outside of the mobile network, the application service provider system comprising:

a network interface;

a processor subsystem configured to, using the network interface:

obtain an external endpoint identifier of an external endpoint of the edge application server from a mapping system on the basis of a client identifier of a client device which client device is configured to utilize an edge application service of the edge application server, wherein the external endpoint allows the edge application server to be reached by data communication from outside of the mobile network;

using the external endpoint identifier of the edge application server, setup an application data flow between the edge application server and a remote server outside of the mobile network.

8. The application service provider system according to claim 7, wherein the remote server is one of:

another edge application server of another mobile network; and a cloud server.

9. A computer-implemented method for facilitating setup of an application data flow between an edge application server which is instantiated on one or more edge nodes of a mobile network and a remote server outside of the mobile network, the method comprising:

obtaining a client identifier identifying a client device configured to utilize an edge application service of the edge application server;

obtaining an external endpoint identifier of an external endpoint of the edge application server, wherein the external endpoint allows the edge application server to be reached by data communication from outside of the mobile network;

generating mapping data associating the client identifier with the external endpoint identifier; and using the mapping data, provide a communication interface to enable a network entity which is configured to setup the application data flow between the edge application server and the remote server to obtain the external endpoint identifier on the basis of the client identifier.

10. A computer-implemented method for setting up an application data flow between an edge application server which is instantiated on one or more edge nodes of a mobile network and a remote server outside of the mobile network, the method comprising:

obtaining an external endpoint identifier of an external endpoint of the edge application server from a mapping system on the basis of a client identifier of a client device which client device is configured to utilize an edge application service of the edge application server, wherein the external endpoint allows the edge application server to be reached by data communication from outside of the mobile network;

using the external endpoint identifier of the edge application server, setting up an application data flow between the edge application server and a remote server outside of the mobile network.

11. A computer-readable medium comprising transitory or non-transitory data representing a computer program, the computer program comprising instructions for causing a processor system to perform the method according to claim 9.

* * * * *